July 2, 1963

R. L. PROPST 3,095,625

CONNECTOR

Filed Aug. 15, 1960

INVENTOR
ROBERT L. PROPST

BY *Price and Heneveld*

ATTORNEYS

July 2, 1963     R. L. PROPST     3,095,625
CONNECTOR

Filed Aug. 15, 1960     2 Sheets-Sheet 2

INVENTOR
ROBERT L. PROPST

BY *Price and Heneveld*

ATTORNEYS

United States Patent Office 3,095,625
Patented July 2, 1963

3,095,625
CONNECTOR
Robert L. Propst, Englewood, Colo., assignor to Herman Miller, Inc., Zeeland, Mich., a corporation of Michigan
Filed Aug. 15, 1960, Ser. No. 49,740
14 Claims. (Cl. 24—217)

This invention relates to a connector. More particularly, this invention relates to a device for connecting two pieces of material, such as pieces of furniture and the like.

There are many ways and means of joining together two pieces of furniture. One of the best known ways is to rabbet the pieces of furniture to be joined and then glue the rabbeted joint. Another manner of fastening pieces of furniture is to join the pieces together by gluing and then reinforcing the joint by angle braces which are screwed or glued to the furniture pieces. These are just a few of the various methods used. Although these fastening methods are adequate, it is usually necessary to erect the furniture at the factory when such methods are practiced. It is not always desirable to assemble the furniture at the factory due to the fact that preassembled furniture greatly increases the cost of shipping and therefore the final cost of the furniture.

It is therefore an object of the present invention to disclose a connector which can be used to assemble furniture after it has reached its destination. The furniture can then be assembled by the wholesaler, retailer or even the purchaser. This connector itself may have all of the elements thereof installed initially at the point of manufacture, the pieces of furniture later being assembled by merely positioning two connector elements adjacent each other and inserting one into the other by means of pressure.

It is also an object of this invention to provide a connector which can be readily secured to furniture pieces by a fastener such as screws or by bonding.

Another object of this invention is to provide such a connector which is very simple in operation, it being impossible to improperly connect the two pieces of furniture together.

A further object of this invention is to provide such a connector utilizing a tensioned member, the tension being released and the member securely holding the two pieces of furniture together when placed adjacent one another and pressure being applied.

A still further object of this invention is to provide a connector which inherently assures at least a two-point connection, the two connected pieces of furniture thereby being immovable with respect to one another.

Still another object of this invention is to provide such a connector which achieves all of these objects, at the same time being simple in construction and therefore easy to fabricate.

These and other objects of this invention will become obvious to those skilled in the connector art upon reading the following specification in conjunction with the accompanying drawings, wherein.

Briefly, this invention relates to a device for connecting two pieces of material comprising a first connector means secured to one piece of material and a second connector means secured to the other piece of material. The second connector means includes a tensioned member adapted to receive the first connector means and hold the two pieces of material together upon the release of tension. In one embodiment of this invention, the first connector means includes a pair of rigid flanges secured to one piece of material. The second connector means includes a generally V-shaped member having legs held in tensioned position with respect to one another. An element releasably holds these legs under tension. The flanges engage this element after passing about the legs, whereby pressure applied to the flanges moves the element and releases the tension, the legs thereby bearing against and preventing movement of the flanges. In the other embodiment of this invention, the first connector means includes a rigid bar secured to one piece of material. The second connector means includes an elongated tube-shaped member having a slit along its length. An element is positioned within this member releasably expanding it under tension. The bar engages the element after passing through the slit, whereby pressure applied to the bar moves the element and releases the tension, the member thereby enveloping the bar and preventing movement thereof.

Figure 1:
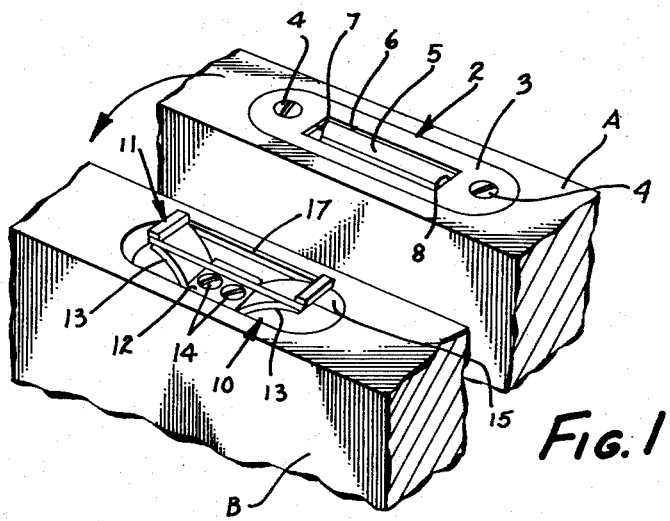
FIG. 1 is a perspective view of the two connector means mounted in two pieces of material comprising one embodiment of the connector of this invention.
Figure 2:
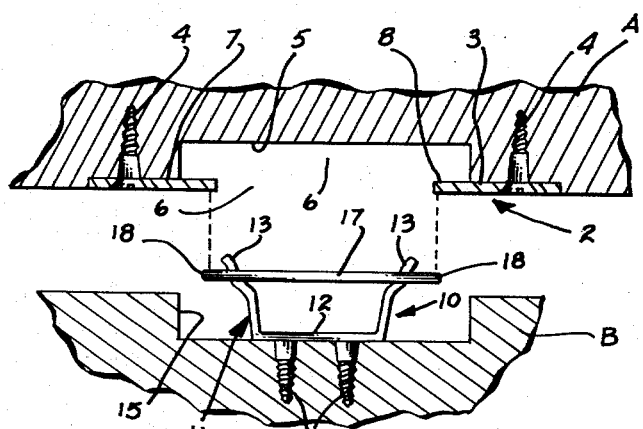
FIG. 2 is a longitudinal, cross sectional view of the two connector means shown in FIG. 1, the connector means positioned for connection.
Figure 3:
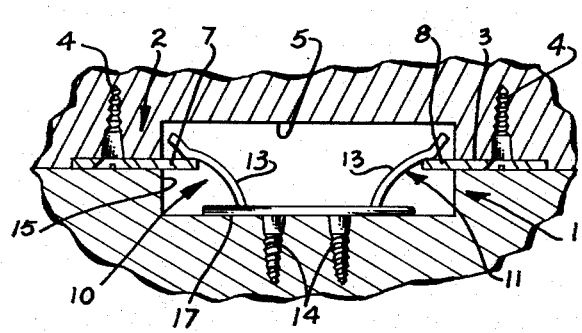
FIG. 3 is a view similar to FIG. 2, showing the connector means in locked position.

Referring more specifically to the drawings, the reference letters A and B in FIG. 1 designate two pieces of material, such as furniture, to be connected together by the connector comprising one embodiment of this invention. This connector element is designated by the reference numeral 1 (FIG. 3) and includes a first connector means 2 and a second connector means 10 (FIGS. 1–3). The first connector means 2 is comprised of a metal plate 3 secured to the piece of material A by means of the screws 4. A recess or cavity 5 is provided below the plate 2, the opening 6 therein exposing this cavity. The opening 6 is of such a size that flanges 7 and 8 are formed at the ends of the opening, above the cavity 5. It will be noted that the plate 3, together with the flanges 7 and 8 lies flush with the surface of the piece of material A.

The second connector means 10 includes a generally U-shaped tensioned member 11 including a bight portion 12 and a pair of legs 13. The tensioned member 11 is secured within a recess or cavity 15 in the piece of material B, by means of the screws 14 extending through the bight portion 12 thereof. It will be noted that the legs 13 of the tensioned member 11 extend slightly above the plane in which lies the surface of the piece of material B. An element 17 extends around the legs 13 of the tensioned member 11, holding these legs in contracted position. The element 17 is preferably comprised of a high-strength steel band. It will be noted that the legs 13 are shaped such that the ends 18 of the band 17 extend slightly past the configuration of the tensioned member 11 (FIG. 2). It will be further noted that the length of the band as positioned around the legs 13 is slightly greater than the length of the opening 6, the purpose of which will be more fully explained hereinafter.

It should be noted that both the first and second connector means 2 and 10 respectively may be assembled and mounted on pieces of furniture at the situs of manufacture. When one desires to secure two pieces of furniture utilizing such connector means together, the two pieces A and B are positioned adjacent each other as shown in FIG. 2. Upon moving the two pieces of furniture together as shown by the dotted lines in FIG. 2, the flanges 7 and 8 of the first connector means 2 pass about the ends of the legs 13 of the tensioned member 10 of the second connector means 10. However, the flanges 7 and 8 engage the element or band 17 holding the legs 13 in contracted position under tension. When the two connector means are thus positioned, pressure is applied by sharply forcing the two pieces of furniture together. Instantaneously, the flanges 7 and 8 dislodge the band 17 from the legs 13 of the tensioned member 11. These legs 13 spring apart, bearing against the flanges 7 and 8, forcing the plate 3 of the first connector means 2 against the other piece of furniture B. With this one simple operation, the two pieces of furniture are securely locked together, relative movement between them being prevented by means of the engagement of the two legs 13 with the flanges 7 and 8. The two pieces of furniture A and B lie tightly against one another, there being no space therebetween due to the tensioned member 11 (FIG. 3).

Figure 4:
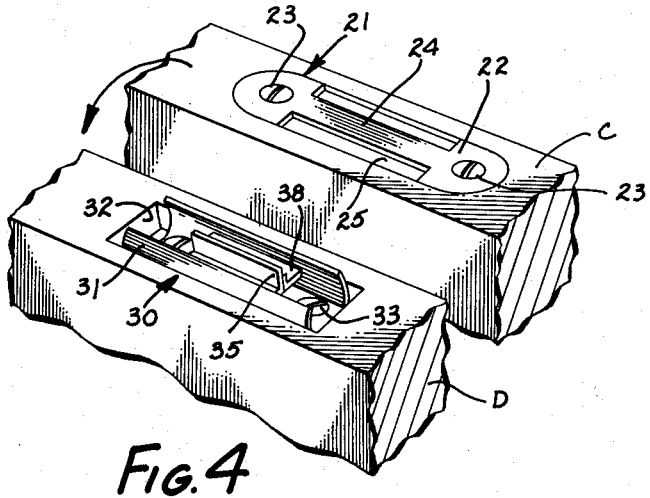
FIG. 4 is a perspective view of two connector means mounted in two pieces of material comprising another embodiment of the connector of this invention.
Figure 6:
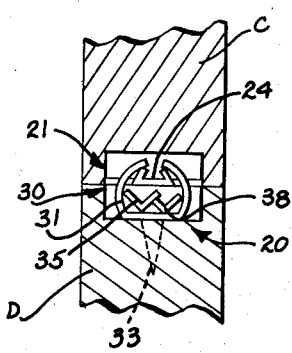
FIG. 6 is a cross sectional view similar to FIG. 5, the connector means being in locked position.
Figure 5:
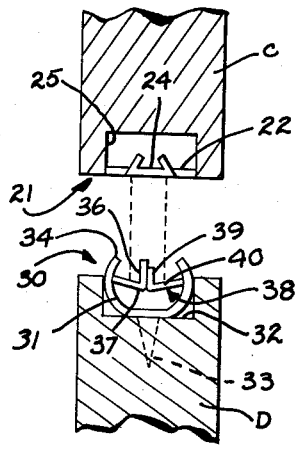
FIG. 5 is a cross sectional view of the connector means shown in FIG. 4, the connector means positioned for locking engagement.

Another embodiment of this invention is shown in FIGS. 4–6. This connector is designated by the reference numeral 20 (FIG. 6) and includes a first connector means 21 secured to the piece of material C and a second connector means 30 secured to a second piece of material D (FIGS. 1–3). The first connector means 21 includes a plate 22 secured to the first piece of material C by means of the screws 23. The plate 22 is shaped such that an elongated, rigid bar 24 lies above a recess or cavity 25 provided in the piece of material. The plate 22 and the bar 24 lie flush with the surface of the piece of material C.

The second connector means 30 includes a generally tube-shaped tensioned member 31 secured within the recess or cavity 32 provided in the second piece of material D by means of the screws 33. The tube-shaped tensioned member 31 is slit at 34 along its length, allowing the member 31 to be forced open. It will be noted that the portion of the tube-shaped tension member including the slit 34 lies above the surface of the second piece of material D, the purpose of which will be more fully explained hereinafter. Mounted within the member 31 are a pair of L-shaped angle members 35 and 38. The angle members 35 and 38 are positioned in back-to-back relationship, the respective legs 36 and 39 thereof bearing against one another. The leg 39 of the angle member 38 is considerably shorter than the leg 36 of the angle member 35. The legs 37 and 40 of the angle members 35 and 38 respectively bear against the sides of the tube-shaped member 31. The angles between the respective legs of the angle members 35 and 38 are preferably less than 90 degrees.

It will again be noted that the first and second connector means 21 and 30 may be assembled and mounted on pieces of furniture C and D at the situs of manufacture. When one wishes to connect two pieces of furniture C and D, the pieces of furniture are positioned adjacent one another as shown in FIG. 5. The pieces of furniture are then moved toward each other as shown by the dotted line, the bar 24 of the first connector means 21 passing through the slit 34 in the member 31 of the second connector means 30. The bar 24 engages the leg 36 of the angle member 35. Upon sharply forcing the two pieces of furniture together, the two angle members 35 and 38 are buckled from their position by the bar 24. The angular relationship of the legs of the angle members, together with the fact that the leg 39 of the angle member 38 is shorter than the leg 36 of the angle member 35, assures that the buckling action which releases tension on the sides of the member 31 will occur upon sharply forcing the two pieces of furniture together. The sides of the member 31 immediately snap to normal position, enveloping the bar 24 of the first connector means 21. The two pieces of furniture C and D are thus locked tightly together. They are immovable with respect to each other due to the length of the member 31 and the bar 24.

The angle members 35 and 38 may be coated with latex to facilitate assembly of this connector by holding these two parts in proper position until the mechanism is triggered. Further, the latex coating will keep these parts from rattling once the joint is assembled.

It will be noted that this invention has provided connectors which can be used to connect pieces of furniture together after they have reached their destination. The wholesaler, retailer, or even the purchaser can connect the furniture quickly and simply. Only one step is needed to achieve this connection since the elements of the connector means are installed initially at the point of manufacture. No tools are needed to carry out this one step. The structure of these connectors is simple, therefore, they are easy and inexpensive to fabricate. These connectors are positive in operation and assure rigid attachments, the pieces of furniture being immovable with respect to one another. Once assembled, there are no parts of the connector showing. The joint is blind.

While certain embodiments only of this invention have been shown and described, it may be possible to practice the invention through the utilization of certain other embodiments without departing from the spirit and scope of this invention. Such other embodiments are to be included as part of this invention as defined by the following claims.

I claim:

1. A device for connecting two pieces of material, comprising: a first connector means secured to one piece of material; a second connector means secured to the other piece of material, said second connector means including a resilient tensioned member; said tensioned member including portions held under tension with respect to each other, said portions thereby normally exerting pressure toward said second means; and an element releasably holding said portions under said tension; said first connector means engaging said element upon being positioned behind said portions; and said element yieldingly movable upon pressure, thereby releasing said portions from said tension, whereby said portion draw said first and second means together and prevent removal of said first connector means.

2. A device for connecting two pieces of material, comprising: a first connector means secured to one piece of material; said first connector means lying flush with the surface of the one piece of material, a cavity being provided therebehind; a second connector means secured to the other piece of material, said second connector means including a resilient tensioned member positioned in a cavity in the other piece of material; said tensioned member including portions held under tension with respect to each other, said portions extending above the surface of the other piece of material and thereby normally exerting a pressure toward their respective cavity; and an element releasably holding said portions under said tension; said first connector means engaging said element upon being positioned behind said portions; and said element yieldingly movable upon pressure, thereby releasing said portions from said tension, whereby said portions draw said first and second means together and prevent removal of said first connector means.

3. A device for connecting two pieces of material comprising: a first connector means including a rigid bar secured to one piece of material; a second connector means secured to the other piece of material; said second connector means including an elongated resilient member having opposed portions held under tension with respect to one another, said portions thereby normally exerting a pressure toward said second connector means; and an element releasably holding said portions under said tension; and said bar engaging said element after passing between said portions, whereby pressure applied to said bar moves said element and releases said tension, said portions thereby drawing said first and second connector means together and preventing movement of said bar.

4. A device for connecting two pieces of material comprising: a first connector means including a rigid bar secured to one piece of material; a second connector means secured to the other piece of material; said second connector means including an elongated resilient tube-shaped member having a slit along its length; and an element positioned within said member releasably expanding said member under tension; and said bar engaging said element after passing through said slit, whereby pressure applied to said bar moves said element and releases said tension, said member thereby enveloping said bar and preventing movement thereof.

5. A device for connecting two pieces of material together as defined in claim 4, said element comprising a pair of L-shaped angles, corresponding legs of said angles bearing against each other and the other legs thereof bearing against opposed sides of said member.

6. A device for connecting two pieces of material together as defined in claim 4, said element comprising a pair of L-shaped angles, a corresponding leg of each of said angles being of different lengths, said corresponding legs bearing against one another and extending toward said slit, and the other legs of said angles bearing against opposed sides of said member.

7. A device for connecting two pieces of material together as defined in claim 4, said element comprising a pair of L-shaped angles having an angle of less than 90 degrees between the legs thereof, a corresponding leg of each of said angles being of different lengths, said corresponding legs bearing against one another and extending toward said slit, and the other legs of said angles bearing against opposed sides of said member.

8. A device for connecting two pieces of material comprising: a first connector means secured to one piece of material, said first connector means including a rigid bar lying generally flush with the surface of the one piece of material, a cavity being provided therebehind; a second connector means secured to and lying within a cavity in the other piece of material; said second connector means including an elongated resilient tube-shaped member having a slit along its length, the portion of said member including said slit lying above the surface of the other piece of material; and an element positioned within said member releasably expanding said member under tension; and said bar engaging said element after passing through said slit, whereby pressure applied to said bar moves said element and releases said tension, said member thereby enveloping said bar and preventing movement thereof.

9. A device for connecting two pieces of material together as defined in claim 8, said element comprising a pair of L-shaped angles, the corresponding legs of said angles being of different lengths, said corresponding legs bearing against one another and extending toward said slit, and the other legs of said angles bearing against opposed sides of said member.

10. A device for connecting two pieces of material comprising: a first connector means including a pair of rigid flanges secured to one piece of material; a second connector means secured to the other piece of material; said second connector means including a resilient member having opposed portions held under tension with respect to one another, said portions thereby normally exerting a pressure toward said second connector means; and an element releasably holding said portions under said tension; and said flanges engaging said element after passing behind said portions, whereby pressure applied to said flanges moves said element and releases said tension, said portions thereby bearing against said flanges and drawing said first and second connector means together and preventing movement of said flanges.

11. A device for connecting two pieces of material comprising: a first connector means including a pair of rigid flanges secured to one piece of material; a second connector means secured to the other piece of material; said second connector means including a generally U-shaped resilient member having legs held in tensioned position with respect to one another, said legs thereby normally exerting a pressure toward said second connector means; and an element releasably holding said legs under said tension; and said flanges engaging said element after passing about said legs, whereby pressure applied to said flanges moves said element and releases said tension, said legs thereby bearing against said flanges and drawing said first and second connector means together and preventing movement of said flanges.

12. A device for connecting two pieces of material together as defined in claim 11, said element comprising a taut band extending about said legs.

13. A device for connecting two pieces of material comprising: a first connector means including a pair of spaced, rigid flanges secured to one piece of material, said flanges extending toward each other and lying generally flush with the top of the one piece of material, a cavity provided below said flanges; a second connector means positioned within a cavity in and secured to the other piece of material; said second connector means including a U-shaped resilient member having legs held in tensioned contraction with respect to one another, the end portions of said legs extending above the surface of the other piece of material; and an element releasably holding said portions under said tension; and said flanges engaging said element after passing about said portions, whereby pressure applied to said flanges moves said element and releases said tension, said portions of said legs thereby bearing against and preventing movement of said flanges.

14. A device for connecting two pieces of material together as defined in claim 13, said element comprising a taut band extending about said legs.

References Cited in the file of this patent

UNITED STATES PATENTS

| 1,426,237 | Witzberger | Aug. 15, 1922 |
| 1,563,351 | Field et al. | Dec. 1, 1925 |
| 2,806,726 | Broberg | Sept. 17, 1957 |
| 2,908,059 | Domenech et al. | Oct. 13, 1959 |

FOREIGN PATENTS

| 351,208 | Germany | Apr. 3, 1922 |
| 360,835 | Germany | Oct. 7, 1922 |